Oct. 17, 1967  E. R. NIGHTINGALE, JR  3,347,626
DEHYDRATION OF MAGNESIUM CHLORIDE USING GASEOUS AMMONIA
Filed March 24, 1965
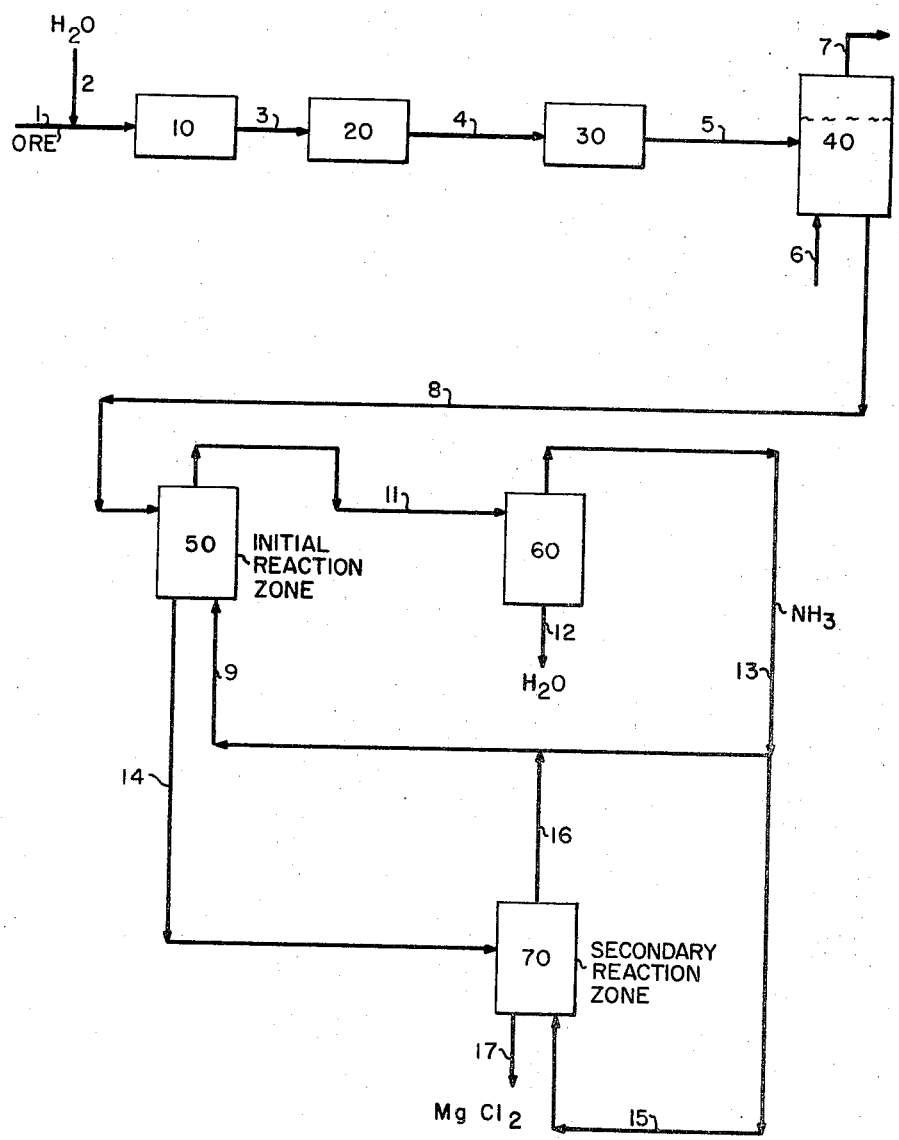
Eugene Richard Nightingale, Jr Inventor
By W. O. Heilman
Patent Attorney

United States Patent Office 3,347,626
Patented Oct. 17, 1967

3,347,626
DEHYDRATION OF MAGNESIUM CHLORIDE USING GASEOUS AMMONIA
Eugene Richard Nightingale, Jr., Murray Hill, N.J., assignor to Esso Research and Engineering Company, a corporation of Delaware
Filed Mar. 24, 1965, Ser. No. 442,444
3 Claims. (Cl. 23—91)

ABSTRACT OF THE DISCLOSURE

Magnesium chloride is dehydrated by fluidizing particles of hydrated magnesium chloride in an initial zone using gaseous ammonia as a fluidizing gas. The displaced water and excess ammonia is removed overhead. Particles of dehydrated magnesium chloride ammoniate are removed from the initial zone and passed to a secondary zone to segregate ammonia and dehydrated magnesium chloride.

The present invention is broadly concerned with the purification and dehydration of magnesium chloride so as to produce anhydrous magnesium chloride which may be further processed by means of an electrolytic cell. The invention is specifically concerned with a technique for the dehydration of magnesium chloride utilizing a plurality of integrated processing zones wherein the last traces of water are removed by the use of gaseous ammonia. The magnesium chloride ammoniate product produced is then processed in a manner to produce anhydrous magnesium chloride and to regenerate the ammonia for recycling to the system.

It is known in the art that naturally occurring magnesium chloride, ores or brines, generally contains associated therewith about six molecules of water of hydration (MgCl·6H$_2$O). It is also known in the art that by known dehydration processes it is possible to remove about four molecules of water without securing undesirable side reactions. However, if further dehydration is continued by known techniques in order to remove the remaining two molecules of water, undesirable side reactions occur such as the formation of magnesium hydroxy chloride, magnesium oxide and hydrochloride acid. This is very undesirable, particularly if the magnesium chloride is to be further processed by electrolysis.

It has now been discovered that if a plurality of interrelated stages or reaction zones are employed which utilize the techniques of replacing the last traces of moisture with gaseous ammonia, unexpected desirable results are secured. By the present technique an anhydrous high quality magnesium chloride product is secured and the ammonia is readily regenerated for recycling to the system.

The present invention may be more fully understood by reference to the drawing illustrating one embodiment of the same. Referring specifically to the drawing, the magnesium chloride ore as mined is processed by conventional technology to separate out the undesirable insolubles, such as gangue, mud slime, etc. The thus separated magnesium chloride ore is then slurried with water and introduced into a first stage evaporation zone 10 by means of line 1. The slurry is produced by the introduction of water by means of line 2. The ore is then introduced into a second evaporation zone 20 by means of line 3 and finally into a crystallization stage 30 by means of line 4.

Generally, this pretreatment by the use of evaporation and crystallization stages or zones is conventional and, in essence, comprises a means for concentrating MgCl$_2$ from ores containing soluble constituents such as sodium, potassium, chloride, and sulfate ions by use of conventional phase rule technology. One example of the effect of such pretreatment may be given in which the ore from which the insoluble gangue had been separated contained on a dry basis about 56 wt. percent MgCl$_2$, about 14 wt. percent MgSO$_4$, about 17 wt. percent KCl, and about 13 wt. percent NaCl. Following treatment of the slurry in two evaporation stages and one crystallization stage, a slurry rich in bischofite (MgCl$_2$·6H$_2$O) was obtained in which the composition on a dry basis was about 98 wt. percent MgCl$_2$ (as MgCl$_2$·6H$_2$O), about 1 wt. percent KCl (as MgCl$_2$·KCl·6H$_2$O), and about 1 wt. percent NaCl. An essential feature of this pretreatment is a means of rejecting undesirable constituents such as sulfate ions. Depending on the temperatures and pressures of evaporation and crystallization, such sulfate may be rejected by precipitation as langbeinite (K$_2$SO$_4$·2MgSO$_4$), kainite (MgSO$_4$·KCl·3H$_2$O), kieserite (MgSO$_4$·H$_2$O), etc.

The treated slurry withdrawn from crystallization stage 30 by means of line 5 may vary appreciably and may contain for example from about 80 to 99% of

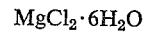

from about 0.5 to 10% of MgCl$_2$·KCl·6H$_2$O, from about 0.1 to 3% of NaCl and from about 2 to 15% or more of water. A typical analysis of the slurry withdrawn by means of line 5 is about 83.4% MgCl$_2$·6H$_2$O, about 4.6% MgCl$_2$·KCl·6H$_2$O, about 0.4% NaCl and about 11.6% of water.

In accordance with the present invention, this slurry is introduced into a dehydration zone 40 by means of line 5. While a kiln may be used, it is preferred that the initial dehydration zone 40 be of a conventional fluid bed design in which the fluidizing gas is introduced by means of line 6 and removed overhead by means of line 7 along with water vapor. The dehydration gas or fluidizing gas may be any inert gas such as nitrogen, hot air or combustion gas. It is preferred that the fluidizing gas comprise hot air or combustion gas. The temperature maintained in zone 40 by conventional means is in the range from about 115° C. to about 250° C., preferably about 160° C., while the pressure is 0.1 to 4 atmospheres, preferably about 1 atmosphere.

The partially dehydrated magnesium chloride containing about two molecules of water of hydration is removed from zone 40 by means of line 8 and introduced into an initial reaction zone 50. It is preferred that reaction zone 50 be of a conventional fluid bed type where the ammonia gas also functions as the fluidizing gas. The ammonia is introduced into the lower area of zone 50 by means of line 9. The temperature maintained in reaction zone 50 is in the range from about 115° C. to 300° C., preferably a temperature of about 200° C. Under these conditions the water in the magnesium chloride is replaced to form magnesium chloride ammoniate with a composition of approximately MgCl$_2$·2NH$_3$. Ammonia gas, along with moisture, is withdrawn overhead from fluidization zone 50 by means of line 11 and introduced into a conventional drying zone 60. This zone may preferably comprise molecular sieves as a drying agent, but other conventional means of drying may be utilized. Moisture is removed from the drying zone 60 by means of line 12. Anhydrous ammonia is removed overhead from zone 60 by means of line 13, a portion of which is recycled to zone 50 while the remainder is introduced into zone 70 by means of line 15 to function as hereinafter described.

Anhydrous magnesium chloride ammoniate is withdrawn from the bottom of zone 50 by means of line 14 and introduced into fluidization decomposition or secondary reaction zone 70. Fluidization gas is introduced into the bottom of zone 70 by means of line 15 and preferably comprises anhydrous ammonia. Anhydrous ammonia is withdrawn overhead from decomposition zone 70 by means of line 16 while anhydrous magnesium chloride is withdrawn from zone 70 by means of line 17, and further processed as desired. Other inert gases may be used as the fluidizing means such as nitrogen, benzene, and the like.

The temperature in zone 70 is in the range from about 250 to 550° C., preferably about 400° C., while the pressure is in the range from 0.1 to 4 atmospheres, preferably about 1 atmosphere.

The magnesium chloride is withdrawn by means of line 17 and further processed; preferably it is fed to an electrolytic cell. The amount of magnesium chloride product produced in the manner described is about 40.6 lbs. of magnesium chloride (96.3% by weight), 1.2 lbs. of KCl (2.8% by weight) and 0.4 lb. of sodium chloride (about 0.9% by weight) per 100 lbs. bischofite slurry.

What is claimed is:

1. Process for the removal of water of hydration from magnesium chloride which comprises introducing particles of hydrated magnesium chloride into the top of an initial reaction zone maintained at a temperature in the range of from about 115° C. to 300° C. and at a pressure of about 1 atmosphere, maintaining said particles in a fluidized state by the introduction of gaseous ammonia into the lower area of said initial reaction zone, removing magnesium chloride ammoniate from the lower area of said initial reaction zone and passing the same to a secondary reaction zone, maintaining temperature and pressure conditions in said secondary reaction zone so as to decompose the magnesium chloride ammoniate to gaseous ammonia and anhydrous magnesium chloride, removing the ammonia and magnesium chloride as separate streams from said secondary reaction zone, removing a gaseous stream comprising ammonia and water vapor from said initial reaction zone and passing the same to a drying zone, maintaining temperature and pressure conditions in said drying zone to separate water and to secure anhydrous, gaseous ammonia, and recycling said gaseous ammonia to said initial reaction zone.

2. Process as defined by claim 1 wherein the temperature in said secondary reaction zone is in the range from about 250° to 500° C.

3. Process for the dehydration of magnesium chloride containing about 6 molecules of water of hydration which comprises partially dehydrating the magnesium chloride, thereafter fluidizing the partially dehydrated magnesium chloride with gaseous ammonia in an initial reaction zone maintained at a temperature in the range from about 115° C. to 300° C. whereby the water of hydration is replaced with ammonia, removing the water and excess ammonia from the top of said initial reaction zone, removing the magnesium chloride ammoniate product from said initial reaction zone and passing the same to a secondary reaction zone maintained at a temperature in the range from about 250° to 550° C. whereby the ammonia separates and anhydrous magnesium chloride is produced, removing the anhydrous magnesium chloride from said secondary reaction zone and further processing the same.

References Cited
UNITED STATES PATENTS

| | | | |
|---|---|---|---|
| 2,381,995 | 8/1945 | Belchetz | 23—91 |
| 3,014,780 | 12/1961 | Clarke | 23—91 |
| 3,092,450 | 6/1963 | Christensen | 23—91 |

OSCAR R. VERTIZ, *Primary Examiner.*

EDWARD STERN, *Examiner.*